July 5, 1955 M. S. JOHNSON Re. 24,033

LADING TIE ANCHOR

Original Filed April 17, 1952 3 Sheets-Sheet 1

INVENTOR.
Malcolm S. Johnson
BY George Friedman,
Atty

July 5, 1955 M. S. JOHNSON Re. 24,033

LADING TIE ANCHOR

Original Filed April 17, 1952 3 Sheets-Sheet 2

INVENTOR.
Malcolm S. Johnson
BY
George Heidman
Atty.

LADING TIE ANCHOR

Original Filed April 17, 1952 3 Sheets-Sheet 3

INVENTOR.
Malcolm S. Johnson
BY George Hecdman
Atty.

United States Patent Office

Re. 24,033
Reissued July 5, 1955

24,033

LADING TIE ANCHOR

Malcolm S. Johnson, Flossmoor, Ill., assignor to Illinois Railway Equipment Company, Chicago, Ill., a corporation of Illinois Original No. 2,675,766, dated April 20, 1954, Serial No. 282,807, April 17, 1952. Application for reissue December 10, 1954, Serial No. 474,638

9 Claims. (Cl. 105—369)

Matter enclosed in heavy brackets [ ] appears in the original patent but forms no part of this reissue specification; matter printed in italics indicates the additions made by reissue.

My invention relates to means for railroad house cars whereby the lading may be easily anchored by suitable tie straps or wires to the car walls against shifting during transit; said means being formed to permit permanent attachment to the car and at the same time present a smooth surface flush with the car side lining.

An object of my invention is the provision of an anchor which eliminates the necessity of driving nails into the car wall or lining, as has heretofore been necessary to secure the strap or wire fastening cleat to the wall; cement coated or barbed nails being employed to reduce the possibility of the anchoring member or cleat pulling from the wall as a result of the shifting of the load. When the lading was to be removed, the operator usually employed a pinch bar or other suitable instrument which is forced back of the cleat to pry it loose—causing all nails generally to be pulled out—macerating and slivering the lining which necessitated replacement.

Another object of my invention is a permanently secured anchor which will present a smooth surface flush with the side lining, having no projections on which lading may be impaled or torn the anchor at the same time reenforcing the car inner lining.

Other objects and advantages of my invention will be readily comprehended from the following detailed description of the accompanying drawings wherein.

As my improved anchor is intended to be countersunk in the car lining, of tongue-and-groove boards, so as to extend flush therewith and in order to save time and labor, the lining boards, through the use of a suitable template, are provided at the wood mill with cut-outs at preselected places and at the meeting edges of the boards, with approximately one-half of the cutout in each adjacent edge of both boards. With the lining boards being of a standard thickness and width of comparatively few inches, it is essential to provide an anchor of rather narrow oblong construction to avoid completely severing or cutting entirely transversely through the boards so as to leave a major portion or sufficient part of the boards intact and continuous from end to end.

Figure 1:
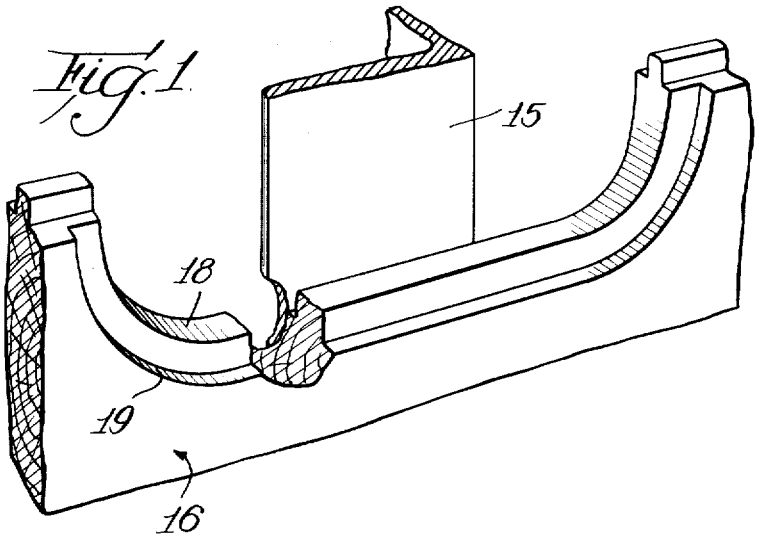
Figure 1 is a perspective view of a portion of a lining board with the lower portion of a cutout adapted to receive my improved anchor; a portion of a structural steel post also being shown.
Figure 3:
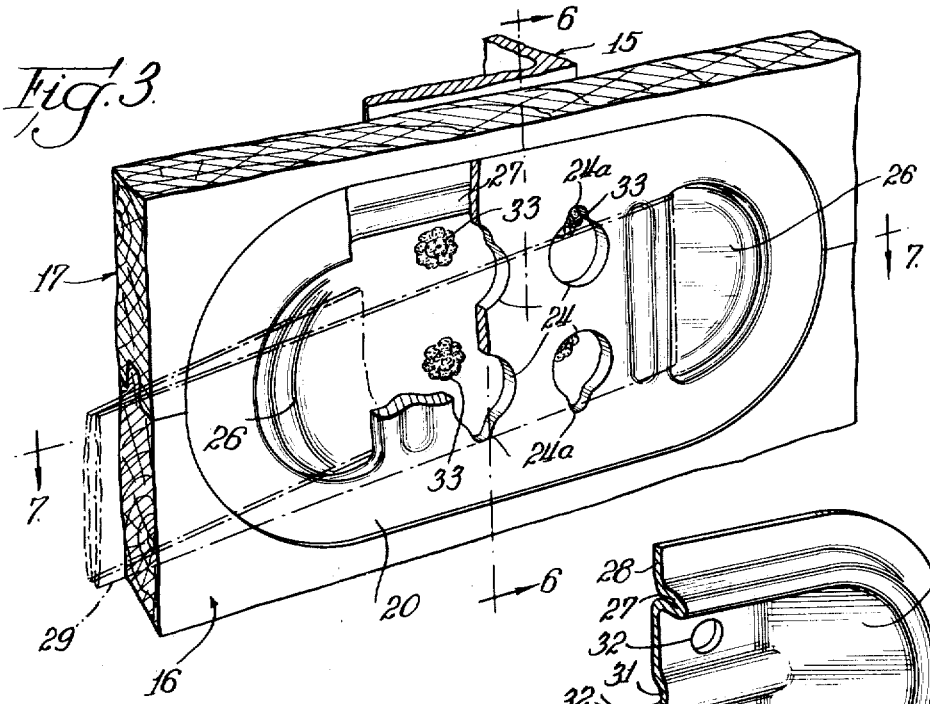
Figure 3 is a perspective view of portions of two matching boards cut-out as shown in Figure 1 and the anchor set in place with a portion of the intermediate tie strap receiving bar broken away and disclosing some of the plug welds and a portion of a tie strap shown in dotted lines.

The board cut-outs, as shown in Figure 1, are located to be coincident with or adjacent the metal or steel uprights or posts of the car superstructure as shown at 15 in Figure 1 where the lower board 16 with its portion or half of the cut-out is shown; while the upper matching board with its half of the cut-out is shown at 17 in Figure 3.

Figure 7:
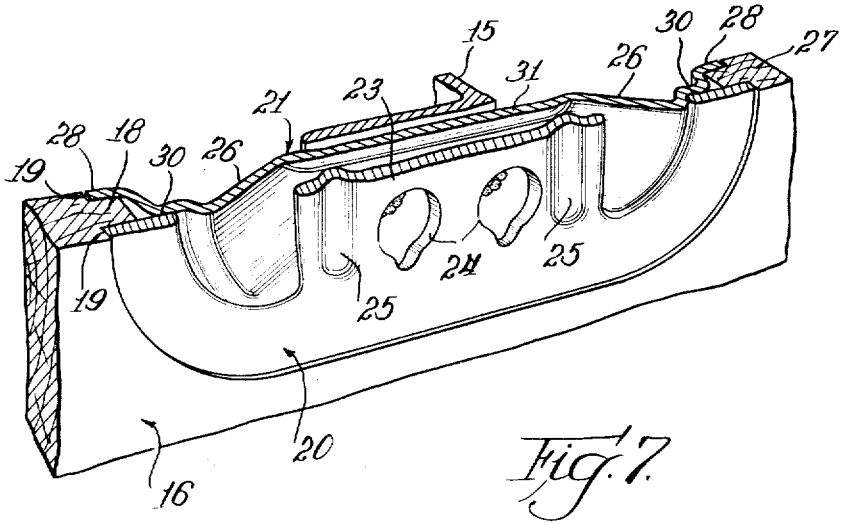
Figure 7 is a horizontal sectional view on the line 7—7 of Figure 3.

As shown in Figure 1, the cut-outs are made to provide the circumscribing tongue-like portion 18 and the base of these tongues, preferably on both sides of the board, are shouldered or gained as shown at 19, Figures 1 and 7.

As strength, labor-saving and time-saving in application are important factors, I have devised a unitary structure, composed of matching front and rear plate portions 20 and 21, preferably of oblong pressed steel which are soldered or brazed into a single oblong unit with the forward outer plate provided at a predetermined distance from its marginal edges with arcuate cut-out portions 22, 22 to receive a tie element at opposite sides of the intermediate wide tie holding bar portion 23, shown preferably provided with a desired number of access-providing holes 24. In order to increase the strength of the tie holding bar, it may be provided with the transversely extending depressed or inwardly struck ribs 25 adjacent the bases of the openings or sockets 22. It will be noted that a wide and strong tie-holding bar portion 23 is provided and that the plate portion 20 is of considerable thickness.

Figure 4:
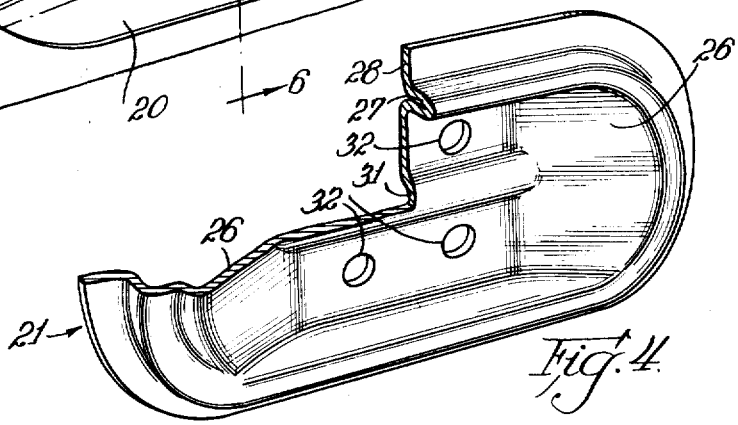
Figure 4 is a perspective view of the forward or inner face of the rear wall-forming or attaching member of the anchor with a segment broken away to more clearly disclose formation.
Figure 5:
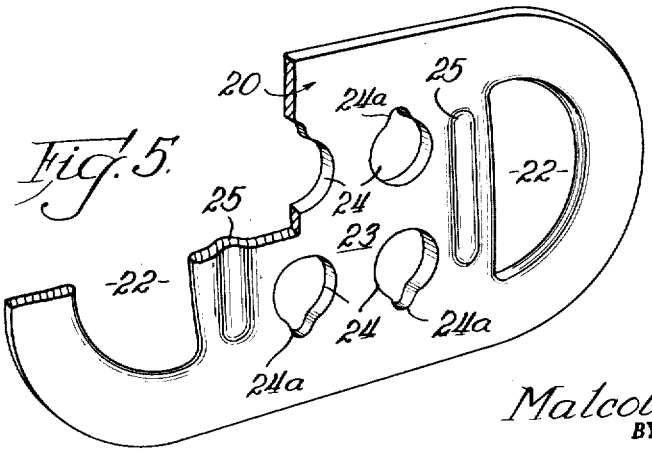
Figure 5 is an outside perspective view of the front wall member of the anchor with a portion cut-away to show configuration.

The rear or retaining plate portion 21, also of oblong pressed steel, at a predetermined distance from its marginal edges, is struck up with a continuous rib 27, see Figure 4, arranged to leave the marginal lining board contacting portion 28; the rib 27 extends toward and is intimately secured to the forward or outer plate member 20, preferably by brazing, soldering or welding to the marginal portion of the outer portion 20 and defines a tie element receiving channel between the plate portions.

Within the area defined by the circumscribing rib 27, the plate portion 21 is pressed forwardly with upwardly sloping portions 26 adjacent opposite ends, which register with the sockets 22 of plate portion 20. The plate portion 21 is intimately secured by welding, preferably by brazing, to the inner face of the forward attaching plate 20 and thereby provides the inwardly sloping inner walls 26 for sockets 22, whereby the tie element, a portion whereof is shown in dotted lines at 29 in Figure 3, is guided rearward of the tie element holding or attaching bar portion 23.

Figure 6:
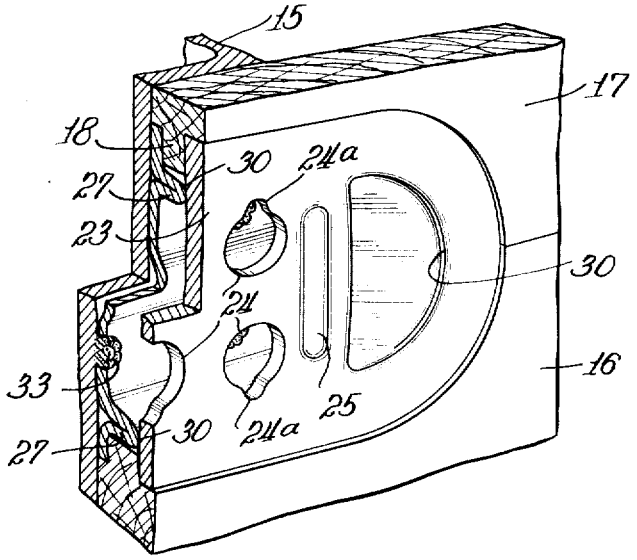
Figure 6 is a vertical sectional view taken on the offset line 6—6 of Figure 3.

The places of welding, soldering or brazing are indicated at 30 in Figures 6 and 7, thereby intimately securing the two plate-like portions into a single or unitary structure. The rear plate portion 21, in its intermediate body portion, is shown provided with a forwardly presented and more or less shallow longitudinally extending rib at 31, see Figure 4, of less height than the continuous rib 27 so as not to contact the forward outer tie attaching plate-like portion 20. This rib provides an uninterrupted channel between the forward outer plate and the base or rear plate for passage of the tie element 29 therethrough, which is guided by rib 31 toward the upwardly sloping surface 26 at the outlet or opposite socket or opening 22.

By brazing the two plate portions together as mentioned, a very strong unitary structure or anchor is provided to be intimately secured to the rigid metal posts of the car superstructure or frame.

To facilitate the securement of the anchor, I prefer to provide the rear or attaching plate portion 21, in its intermediate body portion, with weld-receiving holes as at 32 which register with the larger holes 24 in the forward plate portion 20 and enable the anchor to be plug welded to a steel post or member of the car superstructure.

Figure 2:
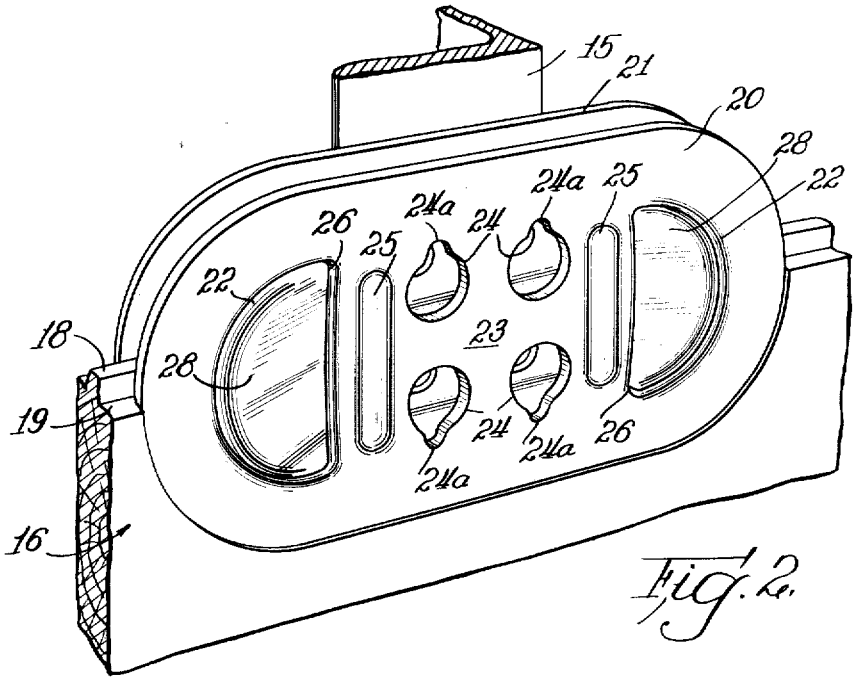
Figure 2 is a similar view with my improved anchor inserted in the cut-out before being welded or secured in place.

As more clearly shown in Figures 2, 6 and 7, the spaced marginal parts of the plate portions 20 and 21 provide a surrounding groove or socket to receive the circumscribing tongue or portion 18 of the car lining; the sides of the tongue and inner marginal surface of plate portion 21, preferably, are slightly tapered so as to effect a snug binding relation between the lining boards and the anchor which will prevent passage of grain or other granular substance.

In order to produce a self-draining of the small quantity of grain which might enter the anchor band-receiving socket between the two plate portions, when the car is used for grain or other granular substance hauling, I preferably make the holes 24, in the face plate 20, somewhat of key-hole configuration, by providing the perimeters of the holes 24—disposed toward the adjacent circumscribing rib 27—with a radially disposed off-set or slot as shown at 24a, extending slightly below the horizontal plane of the inner or upper surface of the circumscribing rib 27, when said holes are adjacent the lower edge of the anchor, as can be seen in Figures 6 and 7. For convenience and to permit either longitudinal edge of the outer plate 20 to be at the upper end of the anchor, all holes 24 are made alike with a slot 24a.

All of the holes 24 in the face plate are similarly formed, as is also true of the marginal groove about the anchor, so that either longitudinal edge of the anchor may be disposed downwardly.

It is apparent that the small quantity of grain that might lodge in the anchor will self-drain out through the hole off-sets 24a of the lowermost holes 24 by the vibrations and jarring of the car.

The holes 24 are shown slightly larger than the holes in the rear attaching plate portion for the convenience of inserting the welding tool therethrough; although the holes may be of the same size, it merely being necessary that they permit insertion of a suitable welding tool.

With both plate portions 20 and 21 made elongated and of similar matching dimensions, the anchor is confined to the cut-outs in the adjacent edges of two lining boards without severing the two boards while leaving the remaining portion of the boards unsevered and continuous adjacent the cut-outs, so that the boards will be greatly reenforced by the overlapping marginal portions of both plate portions of the anchor.

By reason of the configuration of the anchor, it is possible to provide the wide tie or anchor band-receiving bar 23 which enables a proper spacing of the holes 24. Thus the holes are confined entirely within the confines of the circumscribing rib 27. At the same time, the spacing of the holes is designed to be between the planes of the vertical edges of the flat horizontal lining contacting leg or side of the structural posts 15 which are of a conventional Z-bar construction and of given width. With my improved construction, the anchor integral fastenings are all confined within the vertical planes of the side edges of the tie bar-receiving portion 23, thereby concentrating the pulling strains of the lading direct to the car structural post 15, instead of to the rear plate portion 21 of the anchor; and the fastenings or welds confined within the confines of the anchor without the necessity for providing separate openings or holes in the uncut or solid parts of the lining boards beyond the anchor-receiving cut-out heretofore mentioned.

With my improved anchor, the socketed portions of the boards are greatly reenforced; while recesses for bolts, nuts, rivets and the like on the outer forward face of the anchor are eliminated so that injury to lading in the car or to an operator is impossible.

To apply the anchor, the tongue-and-grooved edges of the lining boards—previously provided at the wood mill with the cut-outs as previously described—are positioned in matching relation with the anchor placed in the cut-out of the lower board with the intermediate tongue 18 of the cut-out inserted in the continuous outer perimetrical groove of the anchor, after which the next succeeding upper board is supplied with its portion of the cut-out tongue in the groove at the top and ends of the anchor. This causes the anchor to be firmly held in place and to shift with the boards when the latter are jacked vertically and horizontally to effect snug fitting relation with each other and with the door posts, after which the lining boards are nailed in place and the anchor welded to the car steel member or post by plug welds, as at 33, see Figures 3 and 6.

With the elongated channel in the rear plate portion and the relatively wide tie-holding portion of the face plate element, the use of a straight piece of band tie element may be employed and the inserted end guided out of the channel opposite end by the sloping wall 26; the wide bar portion 23 with its preferably curved edges affording a wide purchase for the tie band or element.

As is apparent, my improved anchor means transmits the lading pulling strains to the metal posts of the car frame instead of to the comparatively thin lining boards, as heretofore has been the case; and while the exemplification shown and described is believed to be the best embodiment of the invention, certain modifications are possible and may be made without, however, departing from the spirit of my invention as defined in the appended claims.

What I claim is:

1. A lading tie anchor adapted to be countersunk in the lining of a railroad house car consisting of a metallic elongated unit composed of a rear or retaining portion adapted to be intimately secured to the metal post of the car superstructure and having forwardly sloping walls adjacent opposite ends, an outer or face plate portion of width and length similar to that of the rear or retaining portion and provided with cut-outs adjacent opposite ends registering with the forwardly sloping walls of the rear portion, said cut-outs being spaced to provide a tie-holding bar-like portion therebetween, and a circumscribing enclosing rib intermediate the rear and face portions at a distance removed from the perimeters of said portions so as to provide a continuous perimetrical groove between the retaining plate and said face plate and to enclose the spacing between the main body parts of the rear and face portions and provide a tie receiving passage between the plate portions accessible through said cut-outs.

2. A lading tie anchor for railroad house cars adapted to be countersunk in the lining of the car consisting of a metallic unit composed of a rear or retaining plate portion dished intermediate its edges with the dished portion terminating at its end in forwardly sloping surfaces and having a forwardly presented circumscribing rib arranged to provide a continuous perimetrical flange, and a face plate portion resting on said rib to provide a tie element receiving space therebeneath with cut-outs registering with the forwardly sloping surfaces of the retaining plate portion whereby access to the space between the plate portions may be had and arranged to provide a wide tie element holding bar-like portion coincident with the dished portion of said first plate portion and to provide a plane perimetrical portion matching the flange of the first mentioned plate portion; both of said plate portions being integrally united by welding along the line of said circumscribing rib to form a single unit with a continuous perimetrical groove adapted to receive portions of the car lining.

3. A lading tie anchor for railroad house cars, adapted to be countersunk in the lining of the car, consisting of metallic elongated unit composed of a rear plate portion dished lengthwisely and terminating in forwardly loping surfaces, with a raised surface extending lengthwise of the dished portion intermediate said sloping surfaces and a circumscribing forwardly presented spacing rib a short distance removed from the perimeter of the plate portion, and a face or attaching plate portion coextensive with the rear plate portion, seated on said spacing rib to provide a tie receiving passage between the two plate portions, and having cut-outs arranged in register with said sloping surfaces and spaced apart, the integral portion of the face plate between said cut-outs constituting a wide tie band holding portion; said plate portions being integrally united into a single-piece anchor by welding along the ridge of said spacing rib to provide a continuous car lining receiving groove about the unit.

4. A lading tie anchor for railroad house cars adapted to be countersunk in the car lining composed of a rear or retaining plate portion arranged to be intimately secured to the metal posts of the car superstructure and provided with a tie element receiving channel terminating at its ends in upwardly sloping surfaces terminating a distance removed from the perimeter of the plate portion to provide a perimetrical flange and having a continuous upstanding and forwardly presented surface adjacent the flange, and a face plate portion, seated on said upstanding surfaces and spaced from the channeled portion of said rear plate, with cut-outs registering with said sloping surfaces and ends of said channel and having a plane surface resting on the continuous upstanding surface and integrally brazed thereto into a single unitary structure, with the integral portion of the face plate between said cut-outs constituting a tie holding bar-like portion.

5. A lading tie anchor for railroad house cars having structural metal posts and inner lining boards with cut-outs at predetermined points comprising an anchor adapted to be countersunk in and arranged flush with the car lining and composed of a rear or retaining plate portion flished intermediate its marginal edges to space the latter inwardly of the car posts and having prearranged weld-receiving holes spaced to register with the car structural metal posts to permit the retaining plate portion to be integrally secured to said posts; a face plate portion coextensive with the retaining plate portion, provided with cut-outs registering with the ends of said dished portion and spaced to provide a tie element holding bar-like portion therebetween, said bar-like portion having openings registering with said weld-receiving holes in the retaining plate portion; and a circumscribing spacing portion at a distance removed from the perimeters of both plate portions and integrally united with both plate portions to provide a perimetrical car lining receiving groove about the anchor.

6. A lading tie anchor for railroad house cars having structural metal posts and inner lining boards provided with cut-outs at the meeting longitudinal edges of adjacent boards, the cut-outs being formed with lips circumscribing the inner perimeter of the cut-outs; anchor means provided with a rear or retaining plate-like portion having a tie element receiving channel and weld or attaching means receiving holes between the ends of the channel and coincident with the car structural post; a face plate portion coextensive with the retaining plate portion, provided with cut-outs registering with the ends of said channel and spaced to provide a tie element receiving transversely extending bar-like portion having holes aligned with said holes in the retaining plate portion, and spacing means between said plate-like portions disposed inward of the perimeters thereof to provide a circumscribing groove about the anchor for receiving the circumscribing lips of the lining boards, the plate-like portions and said spacing means being integrally united into a unitary structure.

7. A lading tie anchor adapted to be intimately secured to a metallic structural post of a railroad car and composed of a rear retaining plate-like portion provided with a tie element receiving channel and formed intermediate of the ends with weld or attaching means receiving portions; a face plate portion provided with openings coincident with the ends of the channel in the retaining plate portion and spaced to provide a wide tie element receiving bar-like portion therebetween, said bar-like portion being formed to permit access to said attaching means receiving portions of the retaining plate portion; and circumscribing spacing means removed from the perimeters of both plate-like portions to provide a lining board receiving groove about the anchor; the plate-like portions and said spacing means being integrally united into a unitary structure with the attaching means portions of the anchor confined within the bounds of said circumscribing spacing means.

8. A lading tie anchor adapted to be intimately secured to a metallic structural post of a railroad car superstructure and composed of a rear retaining plate-like portion formed intermediate its ends with weld or attaching means receiving holes; a face plate portion provided with openings to provide passage of a lading tie element, said openings being spaced to provide a wide tie element holding bar-like portion therebetween, said bar-like portion having holes coincident with said attaching means holes in the retaining plate portion; and a circumscribing spacing rib integral with one of said plate-like portions and intimately secured to the other plate-like portion whereby both plate-like portions are secured into a unitary structure; the holes in said face plate portion having off-set slots extending slightly beneath the upper inner face of the spacing rib to provide self-draining holes.

9. A lading tie anchor adapted to be intimately secured to a metallic structural post of a railroad car superstructure and composed of a pair of plate-like portions and a circumscribing spacing rib removed from the perimeters of said plate-like portions whereby both plate-like portions are intimately secured together into a unitary structure with a car lining board receiving circumscribing groove about the perimeter; the rear or retaining plate-like portion having weld-receiving holes intermediate the ends and within the area defined by said spacing rib, while the forward or face plate-like portion has a pair of tie element receiving openings spaced to provide a wide tie bar portion therebetween and said tie bar portion provided with holes registering with said weld-receiving holes and the holes of the face plate portion formed to extend slightly beneath the upper inner surface of said spacing rib to afford self-draining of the anchor.

[10. A lading tie anchor adapted to be intimately secured to a metallic structural post of a railroad car superstructure, comprising an anchor provided on its forward face with a cavity, openings in the forward face communicating with said cavity to receive a lading tie element and an integral tie holding bar-like portion between said openings extending across and intermediate the ends of the cavity to permit a tie holding element to pass therebeneath; the body portion having means associated therewith whereby the anchor may be secured to a structural post of the car, while the edges of the anchor are formed to provide means for holding the lining boards against pressure movement of the car lading.]

[11. In a lading tie anchor adapted to be secured to a structural post of a railroad car superstructure, the combination of the car inner lining provided with cut-outs at the longitudinal edges of adjacent boards and said cut-outs formed to provide circumscribing tongues; and anchor composed of a rear plate-like portion and a forward plate-like portion intimately secured together so as to provide a tie element receiving passage therebetween with openings in the forward plate-like portion communicating with said passage, said openings being spaced to provide a tie element holding portion therebetween, the edges of the anchor being formed to effect interengaging relation with said circumscribing tongues, the anchor being formed for attachment to the car structural post.]

[12. A lading tie anchor for railroad house cars having an inner lining, comprising a unitary structure composed of a rear plate-like portion and a forward plate-like portion, means whereby said portions are maintained and secured together to provide a tie element receiving passage therebetween, the forward plate-like portion having openings communicating with said passage and said openings being spaced to provide a tie element holding portion disposed over said passage, means at the marginal portion of the anchor for supporting the adjacent edges of the car lining, the anchor being formed for attachment to the car structural posts.]

No references cited.